United States Patent [19]

Wells

[11] 4,020,906
[45] May 3, 1977

[54] GARDEN MARKER

[75] Inventor: Leslie H. Wells, Auburn, Calif.

[73] Assignee: The Raymond Lee Organization, Inc., New York, N.Y.; a part interest

[22] Filed: Oct. 3, 1975

[21] Appl. No.: 619,484

[52] U.S. Cl. .................................. 172/350; 111/1; 111/99; 172/535; 172/539; 172/554; 403/349

[51] Int. Cl.² ................... A01B 1/00; A01B 29/04; A01C 5/02

[58] Field of Search .......... 172/349, 350, 535, 539, 172/554, 556, 126, 122, 536, 253; 111/82, 1, 28, 32, 99, 89–91; 403/349

[56] References Cited

UNITED STATES PATENTS

| 36,336 | 9/1862 | Brinkerhoff et al. | 172/539 |
|---|---|---|---|
| 440,015 | 11/1890 | Clark | 172/539 |
| 459,979 | 9/1891 | Rhodes | 172/557 |
| 585,411 | 6/1897 | Taylor | 172/539 |
| 1,104,502 | 7/1914 | Hist | 172/350 X |
| 1,266,617 | 5/1918 | Parsons | 172/350 X |
| 1,951,061 | 3/1934 | Orlow | 111/1 |
| 2,741,968 | 4/1956 | Harris | 172/350 X |
| 3,171,498 | 3/1965 | Logan | 172/556 X |

FOREIGN PATENTS OR APPLICATIONS

| 1,040,837 | 10/1953 | France | 172/539 |
|---|---|---|---|
| 1,434,558 | 12/1966 | France | 111/1 |
| 230,285 | 5/1910 | Germany | 172/556 |

Primary Examiner—Edgar S. Burr
Assistant Examiner—Steven A. Bratlie
Attorney, Agent, or Firm—Howard I. Podell

[57] ABSTRACT

A rotary tool for marking a straight or curved groove in a garden in which seeds are to be laid. The tool includes an enclosed drum, which may be filled with water, with the drum rotatably mounted to a yoke fixed to a handle. A rim centrally fitted with an external V-shaped projecting flange is detachably fastened to the cylindrical drum wall. Alternate detachable rims are provided with each rim fitted with a flange of a different size so as to each form a groove of a different depth when rolled across a garden seed bed.

1 Claim, 4 Drawing Figures

U.S. Patent   May 3, 1977   4,020,906
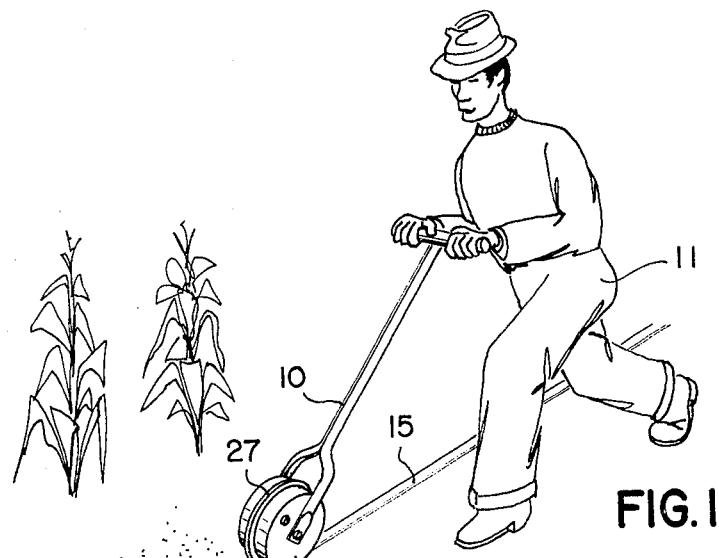
FIG.1
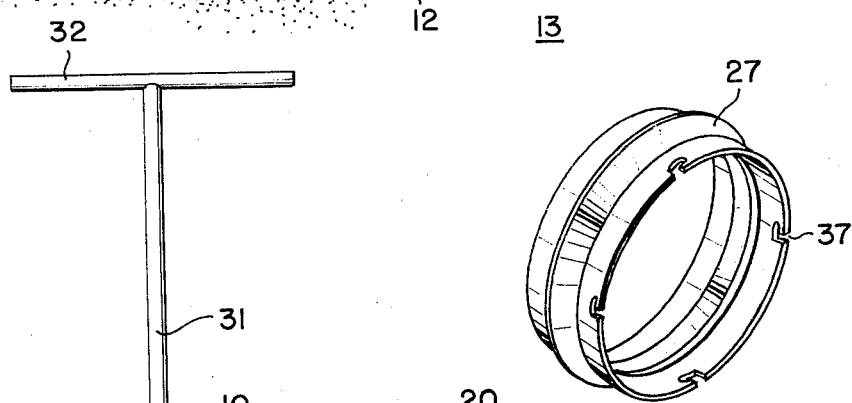
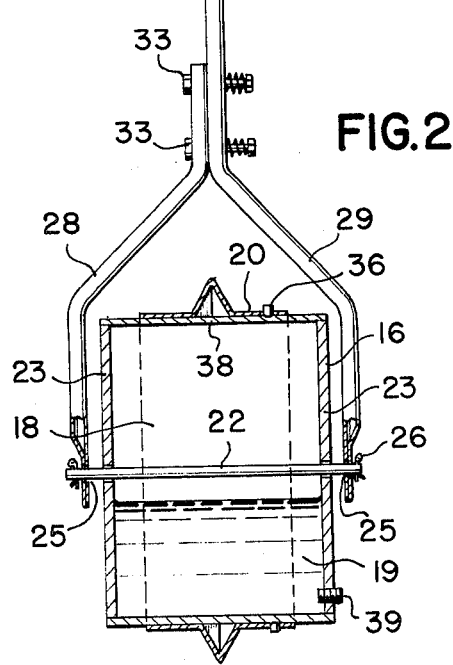
FIG.2
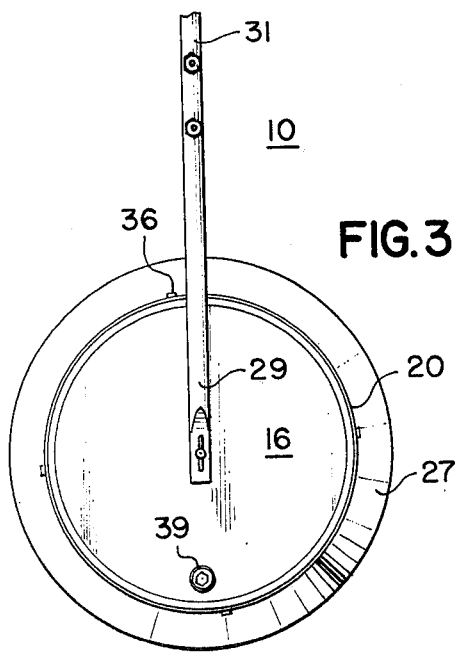
FIG.4
FIG.3

GARDEN MARKER

SUMMARY OF THE INVENTION

My invention is a rotary tool for marking a straight or curved groove in a garden in which seeds are to be laid. The tool includes an enclosed drum, which may be filled with water, with the drum rotatably mounted to a yoke fixed to a handle. A rim centrally fitted with an external V-shaped projecting flange is detachably fastened to the cylindrical drum wall. Alternate detachable rims are provided with each rim fitted with a flange of a different size so as to each form a groove of a different depth when rolled across a garden seed be.

BRIEF DESCRIPTION OF THE DRAWINGS

The objects and features of the invention may be understood with reference to the following detailed description of an illustrative embodiment of the invention, taken together with the accompanying drawings in which:

FIG. 1 is a perspective view of the invention in use;

FIG. 2 is a sectional view in elevation of the invention;

FIG. 3 is a side view of the invention; and

FIG. 4 is a perspective view of a detachable rim.

DESCRIPTION OF THE PREFERRED EMBODIMENT

Turning now descriptively to the drawings, in which similar reference characters denote similar elements throughout the several views, FIG. 1 illustrates a user 11 rolling the cylindrical drum 12 of the tool 10 across garden soil 13 to form a grove 15 in the soil of the depth required for the planting of a specific type of seed (not shown).

As shown in FIGS. 2-3, the tool 10 is formed of a cylindrical drum 16 rotatably mounted on an axle 22 which passes through holes in the circular end plates 23 of the drum and is rotatably mounted in holes 25 of yoke members 28 and 29 that mount about the drum 16. Yoke member 29 is joined to the shank member 31 of the tool handle 31, with yoke member 28 detachable fixed by bolts 33 to the handle shank section 31, with drum 16 oriented to roll on the circular drum wall 38. A threaded plug 39 is mounted in a drum end wall 23 for enclosing ballast water 19 added to the interior 18 of the drum 16.

A circular rim 20 is detachable mounted about the exterior of the circular drum wall 38 so as to form the rolling surface in contact with the soil 13. Rim 20 is fitted with a projecting V-shaped flange 27 about its periphery which flange 27 is shaped to form a groove 15 of a desired width and depth in use.

Rim 20 is held in place by rivets 36 mounted externally to the drum wall 38 with the rivets spaced to each latch into an L-shaped groove 37 of the rim 20.

The tool 10 may be equipped with alternate detachable rims 20 with each rim fitted with a flange 27 of a different size for forming a groove of a different depth.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A tool for forming a groove in a garden in which to plant seeds, said tool comprising a cylindrical drum rotatably mounted to a yoke of a handle shank, and a one-piece projecting collar member detachably mounted about the exterior of the circular rolling surface of the drum, in which the collar member is of a general tubular shape formed with a continuous annular projecting V-shaped flange about its periphery, said flange bounded by a continuous tubular rim section, with, a plurality of L-shaped slots formed in said rim section and each extending to an exterior edge of said rim section and said collar, together with rivets fitted to the said drum that radially project from the exterior rolling surface of the drum, said rivets each aligned to detachably engage one of said slots of the collar member in the assembled condition.

* * * * *